DRILLING MACHINE WITH AN INDEXABLE DRILL HEAD

Filed May 28, 1963

United States Patent Office 3,289,500 Patented Dec. 6, 1966

3,289,500

DRILLING MACHINE WITH AN INDEXABLE DRILL HEAD

William Robert Tarello, Rockville, Md., assignor to Jonker Business Machines, Inc., a corporation of Delaware Filed May 28, 1963, Ser. No. 283,933
2 Claims. (Cl. 77—5)

GENERAL NATURE OF INVENTION

The present invention concerns the so-called superimposable card systems, also known as optical coincidence systems or "peek-a-boo" information control systems. Commercially they are also known as Termatrex Systems. The invention provides an apparatus to perform the functions of this information control principle in a more convenient and economical manner.

This information control system basically provides an index to a large number of items. These items can be documents or people or articles of supply, etc., in which cases the information control system then provides respectively, a library-index, a personnel-index, or a supply-index. In describing this system, as well as the present invention, these systems will, by way of an example, be described in their application as a personnel-index. It should, however, be understood that numerous other applications of the invention are possible and that the invention does not limit itself to this application only.

Generally all items are numbered sequentially. For example, with a personnel index for 10,000 employees, these employees are numbered as follows: 1; 2; 3; 4; 5 . . . 9,997; 9,998; 9,999; 10,000. Personnel will, in general, be classified by such classes as wage class, age class, sex, educational classification, professional training classification, present job classification, special skills, security classification, physical fitness classification, family and children, life insurance, hospitalization, and numerous other classes; for example, a total of 225 classes. Each person is, of course, classified by a number of these classes which may vary, for example, between five and fifty classes.

For such a system a card of a suitable opaque material is dedicated to each of these classes, so that there will be in the example under discussion a total of 225 cards. Each of these cards has a small area dedicated to every item or, in this case, to every person. On every one of the 225 cards the same area is dedicated to the same item, or in the case of the example under discussion, to the same person. In the example under discussion each card will then have 10,000 of these dedicated positions.

In general, these characteristic cards will further be referred to as term cards. They can be dedicated to any words, phrase or numerical value that is used in the vocabulary of terms to describe the information items, or items for short.

Thus this type of information retrieval system has term cards having holes which designate item numbers.

A certain person, for example, employee #2531, is entered into the system by making a hole at position #2531 in each of the cards dedicated to the classes under which that person is to be entered.

Generally the dedication of position on the term cards is based on an X–Y coordinate system, and there is a one-to-one correspondence between the item number and the coordinates. For example, if the area on the cards is dedicated to a matrix of 100×100 positions, the position dedicated to document #2531 has an X coordinate of 31 positions and a Y coordinate of 25 positions.

If all personnel have in this manner been entered into the system, information can be retrieved from it in the following manner: if a company is, for example, interested in a listing of all personnel of a certain wage class and certain age class and a certain type of education, the cards dedicated to this particular wage class, age class, and educational class are superimposed and held up against a source of light. This will show if and where coinciding holes are present. Wherever there is a coincidence of holes, the number corresponding to such holes designates employees having the required characteristics.

It is also possible to use different ways of relating an item number and a position, or to identify a document by a combination of holes. It is also possible to identify a term by a combination of cards. Both modifications of the use of the invention are included in the invention. However, it will be described on the basis of the dedication of one card per term and one position per item and a matrix of 100×100 positions.

GENERAL NATURE OF PRIOR ART

U.S. Patent #3,052,150 issued September 4, 1962, provides an apparatus for conveniently and economically making holes in the cards in the required places. The apparatus is adapted for making holes in the large number of cards simultaneously. It likewise comprises a light source to show up coincidence of holes of superimposed cards and means to read off the numbers dedicated to such holes conveniently. It will be described in more detail later.

GENERAL NATURE OF IMPROVEMENTS

The present invention provides a number of improvements over this patent, which result in greater operating convenience, reduced operator error during data entry, lower manufacturing cost and more accurate alignment and greater durability. These advantages will become apparent in the specifications. For entry of one document after the other, the drill mechanism should be moved only one position, namely, one position along the X axis, each time a new item is entered. The invention provides a mechanism to effect a one-step movement for this purpose.

FIGURE 1 shows a preferred card drilling arrangement consisting primarily of three major assemblies: the base, the cross cross carriage and the drill carriage.

Figure 1:
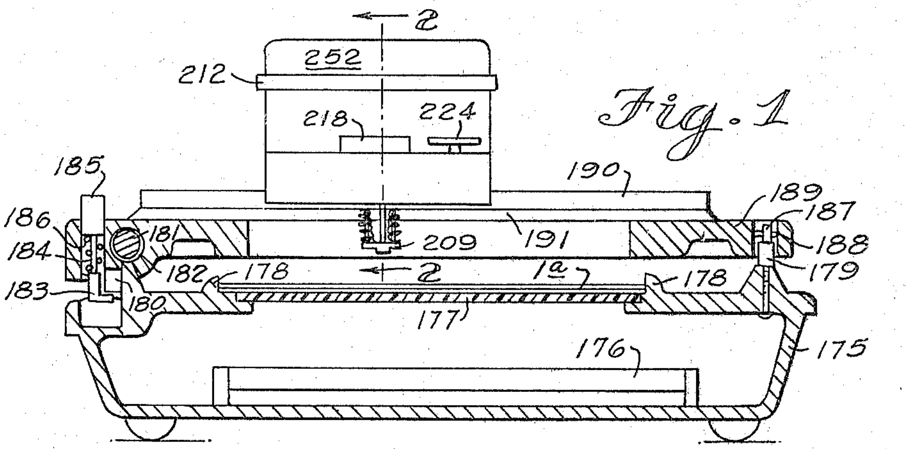
FIG. 1 is an overall view, partly in section, of the preferred embodiment.

The base assembly 175 consists of a plastic molded shell, inside of which is mounted fluorescent tube lamps 176 directly under the rectangular diffusor plate 177. On all sides of the diffusor plate are located card stops 178 to provide register and alignment for the information cards 1*a*. On the right side of the lamp housing is located a metal bar 179 whose precision ground upper edge will be used for bearing support of the right side of the cross carriage.

Mounted on the left side of the base 175 is the detent rack 180 and the guide rail 181 to be used as bearing and Y axis alignment for the bushings 182 located on the cross carriage assembly.

Also located on the left side of the base is the detent arrangement for the cross carriage 189. This arrangement consists of a rack section 183 which engages and locks the detent rack 180 and a pin 184 upon which is mounted a button 185 forced up by a spring 186. When the button 185 is depressed, the rack section 183 is released allowing the cross carriage 189 to slide freely along the Y axis to lock the cross carriage 189 in a specific position in the working area of the information card 1*a*. The operator releases the button 185 which by means of the return spring 186 forces the rack section into engagement with the rack 180 locking the cross carriage 189 to the base assembly.

Mounted on the right side of the cross carriage 189 is a ball bearing 187 held in position by a pin 188 which provides support for this side of the cross carriage 189 and also allows the cross carriage 189 to move freely along the normal axis of the guide rail 179 while giving adequate support to the cross carriage 189 during operation. Also mounted on the cross carriage 189 is a guide rail 190 and a bearing surface 191 that will be used for support and alignment by the drill carriage assembly.

Figures 2, 3:
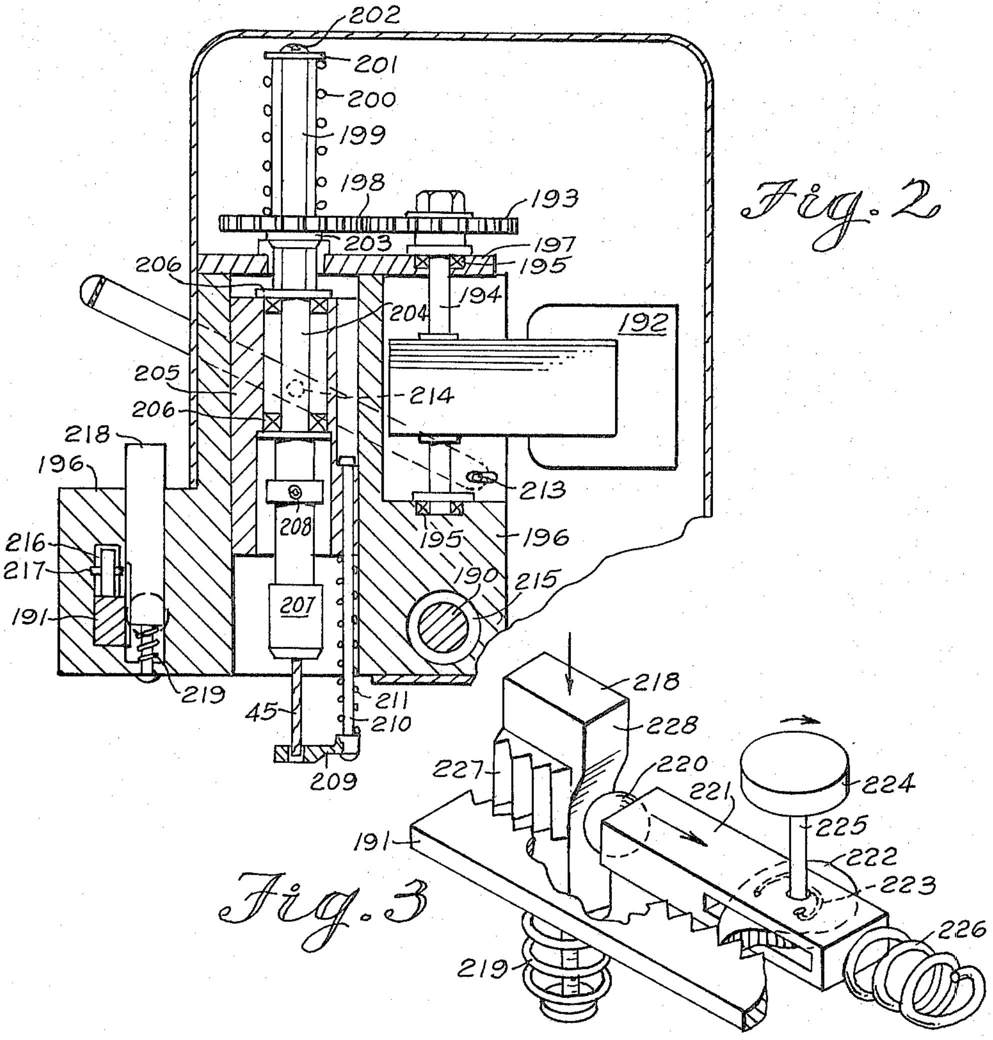
FIG. 2 is an enlarged sectional view taken on line 2—2 of FIG. 1.
FIG. 3 is a fragmentary perspective view of the one-step mechanism.

The drill carriage assembly consists of a drill motor arrangement (FIGURE 2) and an advance mechanism which is shown in detail in FIGURE 3.

FIGURE 2 shows the drive motor 192 turning a drive gear 193 which is locked to the drive motor shaft 194 and supported by two ball bearings 195, one of which is mounted in the drill carriage 196 casting and the other in an alignment plate 197.

The driven gear 198 is mounted on a spline 199 and is maintained in alignment with the drive gear 193 by a compression spring 200 constrained by a washer 201 which is held in place by means of a screw 202 which forces the driven gear 198 against a bushing 203 pressed and locked into the alignment plate 197. Also mounted in line directly with the spline is a drill shaft 204 which is secured to the drill guide 205 by means of two flanged ball bearings 206. The collet arrangement 208 will allow the easy replacement of the drill bit 45. The drill bushing 209 which maintains alignment of the drill 45 is mounted on two rods 210, only one of which is shown in this cross sectional view. This bushing 209 is held against the top term card 1*a* during the drilling operation by means of the force provided by the compression spring 211.

The drill shaft assembly connected to the drill handle 212 by means of pin 214 acting as pivot point is lowered by means of pressing down on the handle 212 which then pivots at the handle pivot point 213.

The rear of the drill carriage is supported by means of two bushings 215 mounted in the drill carriage 196. The forward part of the drill carriage 196 is supported by means of a ball bearing 216 mounted to the drill carriage 196 by means of a mounting pin 217.

The detent arrangement shown in a perspective view in detail in FIGURE 3 consists primarily of a machined rack 191 which is secured to the cross carriage 189. The arrangement includes a detent actuator 218, an actuator return spring 219, a rider ball 220, a detent plunger 221, a pawl 222, a pawl spring 223, an operating knob 224, a connecting shaft 225, and a detent plunger return spring 226, one side of which bears against the detent plunger 221, while the other side bears against the drill carriage 196.

When the detent actuator 218 is pressed downward the teeth 227 machined into the actuator 218 engage the teeth of the rack 191 locking the drill carriage 196 to the cross carriage 189. The linear pitch of these teeth 227 is the same as the hole spacing between the item holes in the information card 1*a*. The cammed surface 228 which is machined into the side of the detent actuator 218 causes the detent plunger 221 to move against the detent plunger return spring 226 a distance to equal the pitch of the rack 191, causing the spring rider ball 220 and the spring loaded pawl 222 detent to move one position along the rack 191 away from the detent actuator 218 and snap and lock into the next tooth position along the rack 191. When the detent actuator 218 is released the actuator return spring 219 forces the detent actuator 218 back up disengaging the teeth 227 of the detent actuator 218 releasing the drill carriage 196 from the cross carriage 189 and allowing the drill carriage 196 to move one position along the rack. The pawl 222 can be released manually by simply turning the operating knob 224 which is connected to the spring loaded pawl 222 by means of a connecting shaft 225, disengaging the pawl 222 from the rack 191 and allowing the drill carriage 196 to move freely along its support rails.

What is claimed is:

1. In card drilling apparatus of the type comprising a frame including a flat card-supporting area, a cross carriage movably supported on said frame for slidable movement parallel to one major dimension of cards disposed thereon, a drill carriage mounted on said cross carriage for sliding movement parallel to the other major dimension of said cards, and a toothed rack bar carried by said frame for establishing equally-spaced positions of one of said carriages, the improvement comprising a spring-pressed toothed detent member reciprocably mounted on to the last-named carriage for movement through a distance equivalent to one tooth spacing of the rack bar for advancing said carriage stepwise relative to said rack bar, and a spring-pressed detent actuator engaging the teeth of said rack bar.

2. Card drilling apparatus in accordance with claim 1, said actuator including a manually operable cam for pressing said detent member in the direction tending to compress its spring.

References Cited by the Examiner

UNITED STATES PATENTS

| | | | |
|---|---|---|---|
| 874,507 | 12/1907 | Highsmith | 77—19 |
| 1,927,006 | 9/1933 | Guibert et al. | 77—32 |
| 1,977,061 | 10/1934 | Hey | 77—6 |
| 3,180,183 | 4/1965 | Stanley et al. | 77—5 X |

FRANCIS S. HUSAR, *Primary Examiner.*

WILLIAM W. DYER, Jr., *Examiner.*